United States Patent Office 3,600,208
Patented Aug. 17, 1971

3,600,208
SYNTHETIC FILM MATERIALS
Terence Arnold Abbott, Margaret Loudon Clachan, David Rankine Kennedy, and Basil Robert Shephard, Brantham, Manningtree, England, assignors to Bexford Limited, Manningtree, England
No Drawing. Filed Aug. 7, 1967, Ser. No. 658,646
Claims priority, application Great Britain, Aug. 10, 1966, 35,786/66
Int. Cl. G03c 1/80
U.S. Cl. 117—7
4 Claims

ABSTRACT OF THE DISCLOSURE

This application describes a film base material consisting of a film biaxially orientated and heat-set polyethylene terephthalate having thereon a thin layer of either copolymer of vinylidene chloride containing not less than 35 mole percent of vinylidene chloride or of a homopolymer of vinylidene chloride, this said layer having been applied to the polyethylene terephthalate before it has been fully biaxilly oriented and heat-set; and having superimposed on said layer a layer A, the said layer A consisting predominantly of a polyvinyl halogenoester, or a polyvinyl cyanoester or a copolymer of a vinyl-halogenoester or a vinyl-cyanoester with an alpha-beta unsaturated carboxylic acid with acrylamide or methacrylamide or their N-methylol derivatives or with vinyl acetate and/or alcohol, the said layer A having been applied to the film after it has been fully biaxially orientated and heat-set.

---

This invention relates to synthetic film materials, and more particularly to film base materials of use in the production of photographic materials.

It is known that self-supporting films formed of synthetic linear hydrophobic materials, particularly of the polyesters formed by reaction of ethylene glycol and terephthalate acid and synthetic polycarbonates, may be prepared with mechanical and physical and chemical properties which, for example, render them very suitable indeed as base materials on which may be coated silver halide photographic emulsion layers for the production of photographic film materials.

However, since such base materials are inherently highly hydrophobic and the usual gelatin halide emulsions are highly hydrophilic, there is great difficulty in securing adequate anchorage between the base film and the emulsion layer, especially bearing in mind that the anchorage must remain firm throughout the processing sequence of the final photographic film. It is known to deal with such a difficulty by the provision of an anchoring layer or layers (so called "subbing" layers) between the film base and the emulsion layer, and it is an object of the present invention to provide a new method of subbing synthetic linear polyester film base to render it adapted to accept, and hold strongly adherent to it, a layer of a more hydrophilic nature, e.g. one having a basis of gelatin, such as a gelatino silver halide emulsion layer.

Polyethylene terephthalate when so used is invariably biaxially stretched and heat set to produce a dimensionally stable and stronger base. Polyethylene terephthalate film base which has been so treated is usually called orientated polyethylene terephthalate and is hereafter so referred to in this application. It is to be understood that the term orientated as used in this specification refers only to film which has been both biaxially stretched and heat set.

One method of orientating polyethylene terephthalate film comprises stretching the film at 80–100° C. in a longitudinal direction with a draw ratio of 2.5–5.0 while the film is restrained from shrinkage in the other linear dimension, followed by stretching the film at 80–120° C. in the transverse direction with a similar draw ratio while maintaining sufficient tension in the already drawn longitudinal direction to again avoid shrinkage. The film is finally heated at 150–250° for some 0.5–5 minutes while being restrained from shrinkage in both dimensions, the object of such heat-setting and similar annealing processes results in a film showing little or no shrinkage on re-heating to moderate temperatures on a later occasion. As alternative processes film may also be drawn transversely prior to longitudinally or may be biaxially drawn in both dimensions simultaneously.

As it is difficult, in general to coat biaxially orientated and heat-set polyethylene terephthalate film with adherent layers it is becoming increasingly common for the manufacturers of the film base material to supply it with an adherent layer either of a copolymer of vinylidene chloride containing not less than 35 mole percent of vinylidene chloride or of a homopolymer of vinylidene chloride, the layer having been applied to the film base before it has been fully orientated and heat set. This layer may have been applied to extruded amorphous polyethylene terephthalate, uniaxially orientated polyethylene terephthalate or biaxially orientated but not heat-set polyethylene terephthalate.

Therefore according to the present invention there is provided a film base material consisting of a film of biaxially orientated and heat set polyethylene terephthalate having thereon a thin layer of either a copolymer of vinylidene chloride containing not less than 35 mole percent of vinylidene chloride or of a homopolymer of vinylidene chloride, this said thin layer having been applied to the polyethylene terephthalate before it has been fully biaxially orientated and heat-set, and having superimposed on said thin layer a layer A, the said layer A consisting predominantly of a polyvinyl halogenoester, or a polyvinyl-cyanoester, or copolymer of a vinyl-halogenoester or a vinyl-cyanoester with an alpha-beta unsaturated carboxylic acid or with acrylamide or methacrylamide or their N-methylol derivatives or with vinyl acetate and/or vinyl alcohol, the said layer A having been applied to the film after it has been fully biaxially orientated and heat set.

The preferred polyvinyl-halogeno-esters for use in layer A are homopolymers of vinyl mono-, di- or tri-halogeno, especially vinyl mono,- di- or tri-chloroacetate, and polyvinyl monocyanoacetate.

The preferred copolymers for use in layer A are copolymers of vinyl mono-, di- or tri-halogeno-acetate, especially vinyl mono-, di- or tri-chloroacetate or vinyl-mono-cyano-acetate with 1 to 60 mole percent of an alpha-beta unsaturated carboxylic acid such as crotonic acid with acrylamide or methacrylamide or their N-methylol derivatives or with 1 to 60 mole percent of vinylacetate and/or vinyl alcohol.

The homo-polymers of the class defined above may be readily prepared by polymerisation of vinyl mono-, di- or tri-halogenoacetate or vinyl monocyano-acetate monomer, or alternatively by the complete halogeno-acetylation or cyano-acetylation of polyvinyl alcohol. The copolymers with alpha-beta unsaturated carboxylic acids may be prepared by copolymerisation of vinyl mono-, di- or trihalogenoacetate or vinyl mono-cyanoacetate monomer with an alpha-beta unsaturated carboxylic acid. The copolymers with vinyl acetate and/or alcohol may be prepared by copolymerisation of vinyl mono-, di- or trihalogeno or vinyl mono-cyanoacetate with vinyl acetate optionally with subsequent partial hydrolysis to introduce free hydroxyl groups. Alternatively those copolymers may be prepared by direct halogeno-acetylation or cyano acetylation of suitable starting materials such as commercial polyvinyl acetates or polyvinyl alcohols.

The copolymers with acrylamide or methacrylamide or their N-methylol derivatives may be prepared by copolymerisation of vinyl mono-, di-, or tri-halogeno acetate or vinyl monocyanacetate with the amide or N-methylol-amide monomers.

Examples of copolymers of vinylidene chloride containing not less than 35 mole percent of vinylidene chloride are copolymers containing 35 to 96% vinylidene chloride, 3.5 to 64.5% acrylic ester and 0.5 to 25% itaconic acid, all by weight.

The term "thin layer" is used herein to indicate a layer of 1 to 400 microinch thick.

The water insoluble resins of layer A may be prepared as solids and applied from organic solvents or may be dispersed in water with suitable additions of wetting agents and protective colloids. Some of the resins derived from monomers mixtures may be conveniently prepared in the emulsion or latex form with wetting agents and protective colloids present if needed and may be applied to the precoated film base in this form.

Solvent solutions or aqueous dispersions of the resin may be applied by any well-known method of coating such as dip-coating, bead-coating or reverse roller coating.

The film base material so coated gives excellent adhesion to a thin layer of gelatine applied as an aqueous solution or dispersion in organic solvents. Optionally, the gelatin solutions or dispersions may contain additions of synthetic polymers or resins and especially good results are obtained with additions of the resins of layer A.

On coating with gelatino silver halide emulsion and drying, excellent adhesion of the assembly of layer is obtained initially, during processing in aqueous baths and on drying.

The film base material so coated will accept with good anchorage on to the surface of layer A a cellulose acetate or cellulose acetate butyrate layer. These layers may afterwards be hydrolysed on their outer surface and impregnated with a light-sensitive diazonium salt, or may be directly impregnated with a light-sensitive diazonium salt contained in an attacking solvent medium, to produce a diazotype film material.

Similarly the film base material as hereinbefore defined will accept with good anchorage on to the surface of layer A a layer of polyvinyl acetal which may be directly impregnated by a light-sensitive diazonium salt, contained in an attacking solvent medium, to produce a diazotype film material.

Also the film base material as hereinbefore defined will accept with good anchorage onto the surface of layer A a layer of partially hydrolysed polyvinyl acetate which includes a light-sensitive diazonium salt or which is subsequently impregnated with such a salt.

Cross linking agents for the polymers may be present in the said layer A. Examples of suitable cross-linking agents are tetra-isopropyl titanate and hexamethoxy-methyl melamine.

The following examples will serve to illustrate the invention:

EXAMPLE 1

An aqueous latex of a terpolymer of vinylidene chloride-methyl acrylate-itaconic acid polymerised in a ratio by weight of 92/6/2 was prepared and applied to amorphous polyethylene terephthalate film so that there was approx. 1 g. terpolymer per sq. m. The coated film was biaxially orientated and heat-set and a further coating of the following composition applied:

Coat 1

A copolymer containing 70 mole percent of vinyl monochloroacetate and 30 mole percent of vinyl alcohol—1.0 g.
Hexamethoxy-methyl-melamine—0.1 g.
p-Toluene sulphonic acid (1% solution in isopropanol)—1.0 ml.
Acetone—100 ml.
Dried for two minutes at 70° C.

Coat 2

Gelatin—1.0 g.
Water—2.0 ml.
Salicylic acid—0.2 g.
Methanol—50 ml.
Acetone—50 ml.
Ethyl lactate—3 ml.
Formalin (40% aq. solution)—0.06 ml.
A copolymer containing 55 mole percent vinyl monochloracetate and 45 mole percent vinyl alcohol—1.0 g.

Dried for ten minutes at 105° C.

A photographic gelatine-silver halide emulsion coating was then applied and it adhered strongly to the film support and there was no separation of the layers during processing.

EXAMPLE 2

An aqueous latex of a copolymer of vinylidene chloride and acrylonitrile polymerised in the ratio by weight 93/7 was prepared and applied to amorphous polyethylene terephthalate film so that approx. 5 g. of copolymer was applied per sq. m. The coated film was biaxially oriented and heat-set and the following coats applied:

Coat 1

A copolymer containing 70 mole percent vinyl monochloracetate and 30 mole percent vinyl alcohol—1.0 g.
Hexamethoxy-methyl-melamine—0.1 g.
p-Toluene sulphonic acid (1% solution in isopropanol)—1.0 ml.
Acetone—100 ml.

Dried for two minutes at 70° C.

Coat 2

Gelatin—1.4 g.
Polyvinylacetate—0.1 g.
Water—5.0 ml.
Acetic acid—1.0 ml.
Methanol—94.0 ml.
Formalin (40% aqueous solution)—0.1 ml.

Dried for ten minutes at 105° C.

EXAMPLE 3

An aqueous latex of polyvinylidene chloride was prepared and within 24 hours was applied to amorphous polyethylene terephthalate film so that there was approx. 2 g. of polyvinylidene chloride per sq. m. The coated film was then biaxially oriented and heat-set and the following coats applied:

Coat 1

A copolymer containing 50 mole percent mono cyanoacetate and 50 mole percent vinyl alcohol—2.0 g.
Acetone—100 ml.

Dried for two minutes at 60° C.

Coat 2

Gelatin—1.2 g.
Water—5.0 ml.
Acetic acid—1.0 ml.
Methanol—95 ml.

Dried for ten minutes at 105° C.

A photographic gelatine-silver halide emulsion coating was applied directly onto the top coating of the film products of Examples 2 and 3. The layers were strongly adherent to one another and to the film support, so that the final photographic film could be processed without danger of separation of the layers or frilling.

EXAMPLE 4

An aqueous latex of polyvinylidene chloride was prepared and applied to amorphous polyethylene terephthalate film which was then biaxially oriented and heat set. The following aqueous dispersions were then applied:

Coat 1

A copolymer containing 60 mole percent vinyl chloracetate, 39 mole percent vinyl alcohol, 1 mole percent vinyl acetate—4.0 g.
Sodium salt of octyl sulphosuccinate—0.5 g.
Benzyl alcohol—10.0 g.
Water—100 mls.

Dried for 5 mins. at 80° C.

Coat 2

Gelatin—2.0 g.
Water—100 mls.

Dried for 10 mins. at 105° C.

EXAMPLE 5

An aqueous latex of a copolymer of vinylidene chloride and acrylonitrile polymerised in the ratio by wt.: 93/7, was prepared and applied to amorphous polyethylene terephthalate so that approximately 3 g. of copolymer was applied per sq. m. The coated film was biaxially oriented and heat set and the following aqueous dispersions applied:

Coat 1

A copolymer containing 90 mole percent vinyl monochloroacetate and 10 mole percent N-methylol acrylamide—6.0 g.
Coply oxyethylene-oxypropylene—0.4 g.
Water—100 mls.

Dried for 5 mins. at 100° C.

Coat 2

Gelatin—2.0 g.
Formalin (40% aqueous soln.)—0.1 ml.
Water—100 mls.

Dried for 10 mins. at 120° C.

We claim as our invention:

1. A process for the production of film base material consisting of a film of biaxially orientated and heat-set polyethylene terephthalate having thereon, on the same side, two coated layers, which process comprises coating on to the polyethylene terephthalate film a first layer which comprises either a copolymer of vinylidene chloride containing not less than 35% vinylidene chloride and at least one comonomer selected from methyl acrylate, acrylonitrile and itaconic acid or a homopolymer of vinylidene chloride, said first layer having been applied to the polyethylene terephthalate before it has been fully biaxially orientated and heat-set, thereafter fully biaxially orientating and heat-setting the film with said first layer thereon and then coating on said first layer a layer A which consists predominantly of a water-insoluble polymer selected from the class consisting of polyvinyl monochloroactate and copolymers of vinyl monochloroacetate with 1 to 60 mole percent of an alpha beta unsaturated carboxylic acid or with 1 to 30 mole percent of acrylamide or methacrylamide or with 1 to 60 mole percent of vinyl acetate and/or vinyl alcohol, and superimposing on said layer A a second layer comprising gelatin applied from an organic solvent or aqueous dispersion.

2. A process according to claim 1 which comprises in said layer A a cross-linking agent for the polymer.

3. A process according to claim 2 wherein the cross-linking agent is tetra isopropyl titanate or hexamethoxymethyl melamine.

4. A process according to claim 1 wherein said second layer comprises gelatin and at least one polymeric compound which is a polymeric substance as used in layer A.

References Cited

UNITED STATES PATENTS

| | | | |
|---|---|---|---|
| 2,627,088 | 2/1953 | Alles et al. | 96—75X |
| 2,698,240 | 12/1954 | Alles et al. | 96—87 |
| 3,447,947 | 6/1969 | Abbott et al. | 117—138.8 |

RONALD H. SMITH, Primary Examiner

U.S. Cl. X.R.

117—76F, 138.8F, 161UC, 161UB; 96—75, 87R